United States Patent [19]
Stotz et al.

[11] Patent Number: 5,533,443
[45] Date of Patent: Jul. 9, 1996

[54] METHOD FOR INFLUENCING THE THICKNESS AND GLOSS AND/OR SMOOTHNESS IN THE TREATMENT OF FIBER MATERIAL WEBS

[75] Inventors: Wolf G. Stotz, Ravensburg; Josef Schneid, Vogt, both of Germany

[73] Assignee: Sulzer-Escher Wyss GmbH, Ravensburg, Germany

[21] Appl. No.: 255,015

[22] Filed: Jun. 7, 1994

[30] Foreign Application Priority Data

Jun. 24, 1993 [DE] Germany .................. 43 21 061.9

[51] Int. Cl.⁶ .................................................. D21G 1/00
[52] U.S. Cl. .......................... 100/38; 100/47; 100/74; 100/93 RP; 100/162 B
[58] Field of Search ...................... 100/38, 47, 93 RP, 100/162 B, 74

[56] References Cited

U.S. PATENT DOCUMENTS

| | | | |
|---|---|---|---|
| 4,432,277 | 2/1984 | Hartmann | 100/38 |
| 4,498,383 | 2/1985 | Pav et al. | 100/162 B |
| 4,625,637 | 12/1986 | Pav et al. | 100/47 |
| 4,903,517 | 2/1990 | Van Haag et al. | 100/47 |
| 5,029,521 | 7/1991 | Pav et al. | 100/93 RP |

FOREIGN PATENT DOCUMENTS

| | | |
|---|---|---|
| 0132922 | 2/1985 | European Pat. Off. . |
| 3612207 | 11/1986 | Germany . |
| 2105497 | 3/1983 | United Kingdom . |
| 2178509 | 2/1987 | United Kingdom . |

*Primary Examiner*—Stephen F. Gerrity
*Attorney, Agent, or Firm*—Townsend and Townsend and Crew

[57] ABSTRACT

A method which influences the thickness and gloss and/or smoothness in the treatment of fiber material webs in at least one press gap formed by rolls, wherein at least one adjustable deflection roll is used and a plurality of correction sections is provided over the press gap length which can be differently influenced with respect to temperature and/or pressure, and wherein, for the decoupling of the two correction procedures possible pressing force changes in the correction sections of the press gap resulting from local changes in diameter of the relevant roll caused by changes of the surface temperature are at least substantially prevented with the support elements and jacket.

21 Claims, 1 Drawing Sheet

METHOD FOR INFLUENCING THE THICKNESS AND GLOSS AND/OR SMOOTHNESS IN THE TREATMENT OF FIBER MATERIAL WEBS

BACKGROUND OF THE INVENTION

The invention relates to a method for influencing the thickness and gloss and/or smoothness in the treatment of a fiber material web in at least one press gap formed by rolls, wherein at least one of the rolls comprises an adjustable deflection roll with a flexible roll jacket braced in the pressing force plane on a plurality of support elements, and wherein the web thickness present across the width of the fiber material web can be corrected by corresponding pressure loading of the support elements.

It is known for example, that in order to increase the smoothness and gloss of paper, the use of locally heated rolls is frequently necessary in the smoothing mill, even when line forces are large. The dependencies of the moisture content of the paper, of the temperature of the rolls forming the press gap, of the contact pressure force and also of the dwell time in the press gap which has to be taken into account are described, amongst other things, in EP 0 245 250.

Mutual dependencies arise in the known arrangements, in particular in that the zonewise temperature increases of a roll effected for the zonewise influencing of the transverse thickness profile admittedly have the consequence of pressing force changes in the pressure gap but can, however, simultaneously lead to the influencing of the transverse smoothness and gloss profiles.

SUMMARY OF THE INVENTION

It's an object of the invention to provide a process which makes it possible to influence both the thickness and also the gloss and/or smoothness of fiber webs simply and largely separate from one another. Furthermore, this method should be realizable in problem-free manner by means of a corresponding apparatus.

This object underlying the invention is attained in accordance with a first embodiment in that, through a cooperation of support elements and associated sections of the roll jacket, which is correspondingly formed with respect to its flexibility, the adjustable deflection roll has, over the length of the press gap, a plurality of independent pressing force correction sections which at least substantially do not mutually influence each other; in that the desired values of gloss and/or smoothness present over the width of the fiber material web can be influenced by localized changes of the surface temperature extending over at least one temperature correction section of at least one of the two rolls; and in that, for decoupling of the two correction procedures, the changes in the pressing force caused by localized changes of the diameter of the relevant roll resulting from surface temperature changes are at least substantially prevented in the correction sections of the relevant press gap by means of adequate support element and jacket compliance.

In accordance with a second embodiment of the invention, the underlying object is satisfied in that through a cooperation of support elements and associated sections of the roll jacket, which is appropriately designed with respect to its flexibility, the adjustable deflection roll has, over the length of the press gap, a plurality of independent pressure force correction sections which at least substantially do not mutually affect one another; and in that the actual values of gloss and/or smoothness present over the width of the fiber material web are corrected by local change of the surface temperature of at least one of the two rolls, wherein, for the decoupling of the two correction procedures, at least the roll provided for the temperature loading has, in the external region, a thermally poorly conducting layer with a thermally conductive outer layer, the thickness of which should preferably not exceed 0.5 mm, and can be locally heated free from changes of the external diameter. The present invention makes it possible, on the one hand, to correct intentionally, and at least in a manner decoupled from one another from a technical control viewpoint, the thickness fluctuations which arise in the transverse direction of the fiber material web and, on the other hand, fluctuations in the smoothness and/or gloss which arise in the transverse direction of the fiber material web.

For this purpose, in accordance with a first embodiment of the invention, pressing force correction sections are provided which are as far as possible independent of one another. Hydraulic support elements are associated with the correction sections which are, on the one hand, supplied with the same pressure and, on the other hand, are controllable individually with differing pressure in dependence on the actual and desired values of the web thickness. The flexibility of the roll jacket thereby ensures that correction procedures in one correction section which can be selected to be relatively narrow, can, if necessary, act on a small partial area of the adjoining correction section but can in no way act on further correction sections.

Through the individual control of the hydraulic support elements which is provided in dependence on the measured values of the transverse thickness profile of the fiber material web, it is always possible to effect the required thickness corrections.

The decoupling of the two correction procedures which is practically complete from the technical control viewpoint and is physically far-reaching can, in accordance with the invention, be consequentially carried out for a roll pair defining a press gap. However it is also possible to introduce predeterminable and defined mutual correction parameters which are then intentionally set for the individual correction sections. In this way it is possible to compensate for an increase of the web deformability resulting through local temperature increase, i.e. a thickness reduction through corresponding support element relief, i.e. also take account of indirect effects.

In the second embodiment of the invention the fundamental decoupling of the correction procedures is achieved in that the locally heatable roll provided for influencing the smoothness and/or gloss is designed such that the introduction of thermal energy into the roll of the roll surface does not lead to an objectionable change of the outer diameter of the roll. Thus, no changes in the pressing force in the press gap result from heating. This is preferably achieved by a roll which, at least in the outer region, has a thermally poorly conductive flexible layer which is in turn provided with a thin thermally well conducting outer layer.

It is of particular significance for the first embodiment of the invention, and it's also of advantage for the second embodiment, when the roll jacket associated with the plurality of support elements, and thus having a correspondingly high number of correction sections, has almost no, or only a minimal stiffness in the pressing force direction, since the same pressing force then prevails in the press gap independently of its deformation, even when the elements which press the roll jacket against the counter-roll are connected to the same pressure source. In this manner changes in the diameter of the rolls resulting from local thermal loading have no effect on the pressing force in the pressing gap.

Through the provision of an additional control possibility for the plurality of the individual support elements, which are preferably made relatively small, it is possible, to effect thickness corrections over the width of the fiber material web, while retaining the mutual and principal decoupling of the correction of transverse gloss and/or smoothness profiles.

The width of the individual pressing force correction sections is preferably selected in the range from about 25 to 130 mm and preferably this section width amounts to 50 mm. In accordance with an expedient development of the invention, the width of the pressing force correction sections controllable via individual pressures corresponds at least substantially to the respective width of the differentially heatable and/or coolable temperature correction sections; however, it is also possible to associate with the pressing force correction sections, temperature correction sections which deviate with respect to their width in a predeterminable manner from the pressing force correction sections. Advantageous effects can be achieved in dependence on the respective field of use.

It has furthermore proved to be expedient to select the width of the correction sections at the end regions of the rolls to be smaller in order to effect particularly sensitive and differentiated corrections in these critical regions.

DESCRIPTION OF THE PREFERRED EMBODIMENTS

Figure 1:
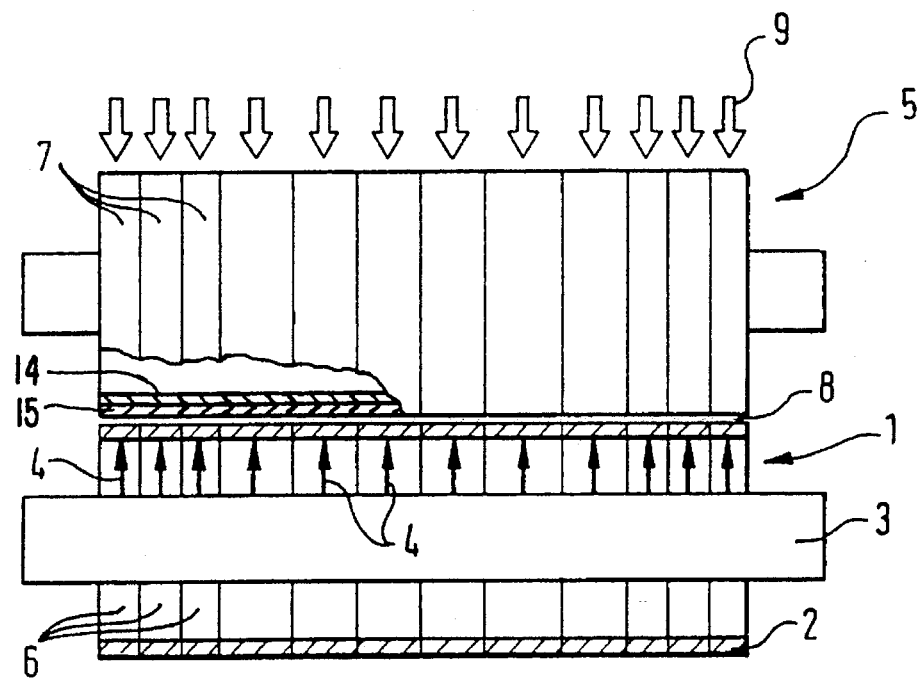
FIG. 1 is a schematic, front elevational view, partially in section, of an apparatus constructed in accordance with the present invention.
Figure 2:
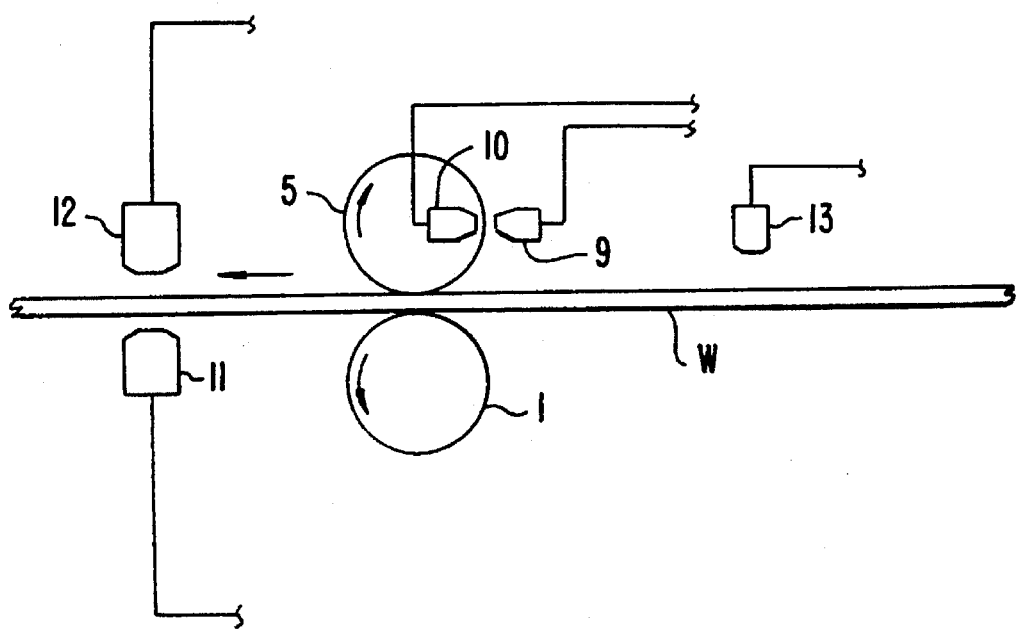
FIG. 2 is a schematic, side elevational view of the apparatus of the present invention shown in FIG. 1.

A roll pair illustrated in the drawing comprises an adjustable deflection roll 1 with a flexible resilient roll jacket 2 having a high compliance or yieldability which is braced relative to a plurality of support elements 4.

A counter-roll 5 having a comparatively high bending stiffness cooperates with adjustable deflection roll 1 so that a press gap 8 is formed.

A plurality of external heating and/or cooling units 9 or internal heating and/or cooling units 10 are associated with the counter-roll 5 and are distributed over the length of the counter-roll 5. Temperature correction sections 7 are formed by the heating and/or cooling units 9, 10. The surface temperature of the temperature correction sections 7 can be individually preset via the units 9 in order to influence the gloss and/or smoothness of fibrous web W. In this way the actual values of gloss and/or smoothness arising over the width of the fiber material web can be influenced or adjusted with local change of the surface temperature. Pressing force correction sections 6 which at least substantially, but not however necessarily, have the same length as the temperature correction section 7 of the counter-roll are also provided at the controllable deflection roll 1. The location of the pressure force correction sections 6 is determined by the working width of support elements 4. The support elements preferably are hydraulic, pneumatic or similarly loadable or energisable support elements.

Considered over the length of the press gap 8 a plurality of correction sections 6, 7 is provided. The zone width of the individual correction sections preferably lies in the range from about 25 mm to 130 mm and it preferably amounts to about 50 mm. The zone width of the correction sections 6, 7 is preferably selected to be smaller in the marginal region of the rolls 5, 6 than in the central region thereof.

The influencing of the thickness and gloss and/or smoothness made possible in the context of the invention by corresponding control of the support elements 4 or of the units 9 for influencing the temperature of the deflection sections 7 has already been explained in detail and does not therefore require repetition.

The thickness of web W is measured with an appropriate instrument 11 located downstream of the press gap 8. The gloss and/or smoothness of the web is measured with a further instrument 12, also located downstream of the press gap. A moistening unit 13 is located upstream of the press gap for moistening the web and influencing its gloss and smoothness in dependence on the values thereof detected by gloss/smoothness measuring instrument 12.

To prevent temperature changes from significantly affecting changes in the diameter of the rolls, particularly the heated/cooled counter-roll 5, a first layer 14 having a relatively low rate of heat conduction can be applied to the exterior of the roll. A second layer 15 having a relatively high rate of heat conductivity is then applied over layer 14 so that, upon heating or cooling, the diameter of the roll remains effectively unchanged.

What is claimed is:

1. Method for influencing at least one of a thickness, gloss and smoothness of a fiber material web in a press gap formed by first and second rolls, at least one of the rolls comprising an adjustable deflection roll including a flexible roll jacket and a plurality of support elements having a length less than and arranged along a length of the deflection roll for bracing the roll jacket when a pressing force is exerted against the web, the method comprising the steps of adjusting the web thickness over a width of the web by varying a pressure exerted by the support elements on the roll jacket, providing a plurality of independent pressing force correction sections associated with the support elements for generating the pressing forces exerted by the respective support elements over the length of the press gap so that they substantially do not mutually influence each other; influencing desired values of at least one of the gloss and the smoothness of the web over its width by changing a surface temperature of at least one of the first and second rolls over at least a portion of the length thereof; and substantially preventing changes in the pressing force resulting from localized changes of a diameter of at least one of the rolls caused by roll surface temperature changes by correspondingly varying with the correction sections the pressing forces exerted by the support elements positioned where roll surface temperature-induced roll diameter changes are to be prevented.

2. Method in accordance with claim 1 wherein hydraulic support elements are associated with the pressing force correction sections, and including the step of supplying the hydraulic support elements with a fluid of a common pressure and applying a differential pressure individually to at least one of the hydraulic support elements in dependence on actual and desired values of the web thickness.

3. Method in accordance with claim 1 including providing a number of pressing force correction sections and providing at least substantially the same number of temperature correction sections on at least one of the rolls, and wherein changing the surface temperature comprises changing the temperature of at least one of the temperature correction sections relative to the temperature of the other temperature correction sections.

4. Method in accordance with claim 1 wherein the steps of generating the pressing forces exerted by the support elements and changing the surface temperature are executed superimposed on one another in dependence on a measured web thickness and a measured value of at least one of the web smoothness and the web gloss.

5. Method in accordance with claim 1 including the step of measuring a profile for at least one of the smoothness and gloss of the web and a profile of the thickness of the web over its width and comparing each with desired values thereof; and wherein the steps of generating the pressing forces exerted by the support elements and changing the surface temperature are performed in dependence on at least one of the measured and actual values of the smoothness, gloss and thickness of the web.

6. A method in accordance with claim 1 including the steps of forming the first roll so that it can be heated in sections, each section extending over a portion of the length of the first roll, and forming the second roll with temperature correction sections which extend over the length of the second roll, each temperature correction section extending over a portion of the length of the roll.

7. A method according to claim 1 including the step of providing the roll jacket with a flexibility selected so that temperature-induced diameter changes of one of the rolls substantially do not influence the pressing force exerted on the web in the pressing gap.

8. A method according to claim 1 wherein changing the surface temperature of at least one of the first and second rolls comprises heating an inside of the roll.

9. A method according to claim 1 wherein changing the surface temperature of at least one of the first and second rolls comprises heating an outside of the roll.

10. A method according to claim 1 including the step of detecting actual values for the gloss, the smoothness and the thickness of the web at a location downstream of the press gap.

11. A method according to claim 1 including the step of detecting values reflecting at least one of the gloss and the smoothness of the web, and including the step of moistening the web in dependence on the detected gloss and smoothness at a location upstream of the press gap.

12. A method according to claim 1 including the step of modifying separately detected values of the gloss, smoothness and thickness of the web, and using the detected values for controlling the correction elements.

13. Method for influencing at least one of a thickness, gloss and smoothness of a fiber material web in a press gap formed by first and second rolls, at least one of the rolls comprising an adjustable deflection roll including a flexible roll jacket and a plurality of support elements having a length less than and arranged along a length of the deflection roll for bracing the roll jacket when a pressing force is exerted against the web, the method comprising the steps of adjusting the web thickness over a width of the web by varying a pressure exerted by the support elements on the roll jacket, providing a plurality of independent pressing force correction sections associated with the support elements for generating the pressing forces exerted by the respective support elements over the length of the press gap so that they substantially do not mutually influence each other; influencing desired values of at least one of the gloss and the smoothness of the web over its width by changing a surface temperature of at least one of the first and second rolls over at least a portion of the length thereof; and substantially preventing changes in the pressing force due to localized changes of a diameter of at least one of the rolls caused by roll surface temperature changes by forming a first layer of a poor heat conducting material to the roll jacket and forming a second layer of a good heat conducting layer over the first layer so that the second layer defines an exterior of the roll which can be heated and cooled without substantially affecting an exterior diameter of the roll.

14. A method according to claim 13, including the step of detecting the actual values of at least one of the gloss and smoothness of the web at a location downstream of the press gap.

15. A method according to claim 13 including the step of detecting values reflecting at least one of the gloss and the smoothness of the web, and including the step of moistening the web in dependence on the detected gloss and smoothness at a location upstream of the press gap.

16. A method according to claim 13 including the step of modifying separately detected values of the gloss, smoothness and thickness of the web, and using the detected values for controlling the correction elements.

17. A method for treating a fibrous web by subjecting it to pressure in a press gap formed by first and second rolls defining a pressing plane, at least one of the rolls comprising an adjustable deflection roll extending in a direction of the press gap and including a flexible roll jacket and a plurality of support elements adapted to apply a force to the roll jacket in the pressing plane, the method comprising the steps of providing a plurality of independent pressing force correction sections associated with the support elements for generating the pressing forces exerted by the respective support elements over the length of the press gap and choosing a roll jacket compliance which is sufficiently low so that the pressing force correction sections substantially do not mutually influence each other.

18. A method according to claim 17 including the step of limiting a length of the support sections in a direction of the press gap to between about 25 mm and 130 mm.

19. A method according to claim 18 wherein a length of the support elements substantially equals the length of the associated roll jacket section.

20. A method according to claim 18 wherein the length of the support elements is about 50 mm.

21. A method for treating a fibrous web by subjecting it to pressure in a press gap formed by first and second rolls defining a pressing plane, at least one of the rolls comprising an adjustable deflection roll extending in a direction of the press gap and including a flexible roll jacket and a plurality of support elements adapted to apply a force to the roll jacket in the pressing plane, the method comprising the steps of providing a plurality of independent pressing force correction sections associated with the support elements for generating the pressing forces exerted by the respective support elements over the length of the press gap and providing the roll jacket with a flexibility selected so that the pressing force exerted by a given one of the pressing force correction sections in the pressing plane substantially does not influence portions of the roll jacket adjacent the given one of the pressing force correction sections.

* * * * *